(12) United States Patent
Kreiner et al.

(10) Patent No.: US 7,302,537 B2
(45) Date of Patent: Nov. 27, 2007

(54) APPARATUS, SYSTEMS AND METHODS FOR BACKING-UP INFORMATION

(75) Inventors: Barrett Kreiner, Norcross, GA (US); Ronald Perrella, Norcross, GA (US); Jonathan Reeves, Roswell, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 388 days.

(21) Appl. No.: 10/964,354

(22) Filed: Oct. 13, 2004

(65) Prior Publication Data

US 2006/0080504 A1  Apr. 13, 2006

(51) Int. Cl.
G06F 12/00 (2006.01)
G06F 3/00 (2006.01)
G06F 13/12 (2006.01)

(52) U.S. Cl. .................. 711/162; 710/15; 710/18; 710/19; 710/74; 711/114; 711/161

(58) Field of Classification Search ............ None
See application file for complete search history.

(56) References Cited

U.S. PATENT DOCUMENTS

| | | | |
|---|---|---|---|
| 6,449,642 B2 * | 9/2002 | Bourke-Dunphy et al. | 709/222 |
| 6,640,278 B1 * | 10/2003 | Nolan et al. | 711/6 |
| 6,715,031 B2 * | 3/2004 | Camble et al. | 711/111 |
| 6,973,516 B1 * | 12/2005 | Athanas et al. | 710/100 |
| 7,020,734 B2 * | 3/2006 | Mimatsu et al. | 710/311 |
| 2002/0143942 A1 * | 10/2002 | Li et al. | 709/225 |
| 2005/0005045 A1 * | 1/2005 | Kim et al. | 710/74 |
| 2005/0097236 A1 * | 5/2005 | Delaney et al. | 710/15 |
| 2005/0102549 A1 * | 5/2005 | Davies et al. | 714/4 |
| 2005/0210098 A1 * | 9/2005 | Nakamichi et al. | 709/203 |
| 2005/0278704 A1 * | 12/2005 | Ebsen | 717/128 |
| 2006/0036786 A1 * | 2/2006 | Kreiner et al. | 710/62 |
| 2006/0077724 A1 * | 4/2006 | Chikusa et al. | 365/189.05 |
| 2006/0101456 A1 * | 5/2006 | Crosier et al. | 717/174 |
| 2006/0168367 A1 * | 7/2006 | Beckett et al. | 710/22 |

* cited by examiner

Primary Examiner—Reginald Bragdon
Assistant Examiner—Mehdi Namazi
(74) Attorney, Agent, or Firm—Withers & Keys, LLC

(57) ABSTRACT

An apparatus is disclosed. The apparatus includes a controller and a storage device. The storage device is in communication with the controller. The apparatus is configured for communication with external devices that adhere to different access protocols.

20 Claims, 3 Drawing Sheets

APPARATUS, SYSTEMS AND METHODS FOR BACKING-UP INFORMATION

BACKGROUND

This application is related, generally and in various embodiments, to an apparatus, systems and methods for backing-up information.

For a variety of reasons, it is prudent for many entities to maintain an accessible duplicate copy of important data. One method of maintaining an accessible duplicate copy of important data is to periodically backup the data to another storage device. Although this is a common practice for many entities, the periodic nature of the backup process exposes the entity to a loss of data if a failure occurs between backup operations.

Another method of maintaining an accessible duplicate copy of data is to employ mirroring—a fault tolerance method in which a backup storage device maintains data identical to that on the primary storage device and can serve to replace the primary if the primary fails. Although this method offers a more current duplicate copy than that provided by the periodic backup method, mirroring is typically associated with a performance degradation of approximately 50% for a write operation.

Another method of maintaining an accessible duplicate copy of data is to write data to a redundant array of inexpensive disks (RAID) such that if a disk drive fails, the data is not lost. In its most elementary form, RAID mirrors data to two disk drives having a common disk geometry. Thus, if one disk drive fails, the data can be accessed from the other disk drive. For more complex implementations, RAID writes data across a plurality of disk drives having a common disk geometry such that if one or more disk drives fail, the data can still be accessed from the remaining disk drives.

Although the above-described methods provide the ability to backup important data, the methods do not necessarily address a common problem experienced by personnel who work at more than one location. For such personnel, a common problem is the inability to easily copy data from a storage device at a first location, subsequently load the information to another storage device at a second location, then access the data at the second location. A lack of common disk geometry, a lack of portability, and a lack of compatible access protocols can all contribute to this problem.

SUMMARY

In one general respect, this application discloses embodiments of an apparatus. According to various embodiments, the apparatus includes a controller and a storage device. The storage device is in communication with the controller. The apparatus is configured for communication with external devices that adhere to different access protocols.

In another general respect, this application discloses embodiments of a system. According to various embodiments, the system includes a first frame, a second frame, and a portable apparatus. The first frame adheres to a first access protocol and includes a first communication port. The second frame adheres to a second access protocol and includes a second communication port. The first access protocol is different than the second access protocol. The portable apparatus includes a controller and a storage device. The storage device is in communication with the controller. The portable apparatus is configured for communication with the first and second frames.

In another general respect, this application discloses embodiments of a method for backing-up information. According to various embodiments, the method includes coupling a portable apparatus having a controller and a storage device in communication with the controller to a first frame that adheres to a first access protocol and includes a first disk group having a first disk configuration, and receiving information from the first disk group at the portable apparatus. The method also includes decoupling the portable apparatus from the first frame, and coupling the portable apparatus to a second frame that adheres to a second access protocol and includes a second disk group having a second disk configuration. The first access protocol is different than the second access protocol and the first disk configuration is different than the second disk configuration. The method further includes sending information from the portable apparatus to the second disk group.

Other embodiments of the disclosed invention will be or become apparent to one skilled in the art upon review of the following drawings and detailed description. It is intended that all such additional embodiments be included within this description, be within the scope of the disclosed invention, and be protected by the accompanying claims.

DETAILED DESCRIPTION

It is to be understood that the figures and descriptions of the disclosed invention have been simplified to illustrate elements that are relevant for a clear understanding of the disclosed invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

Figure 1:
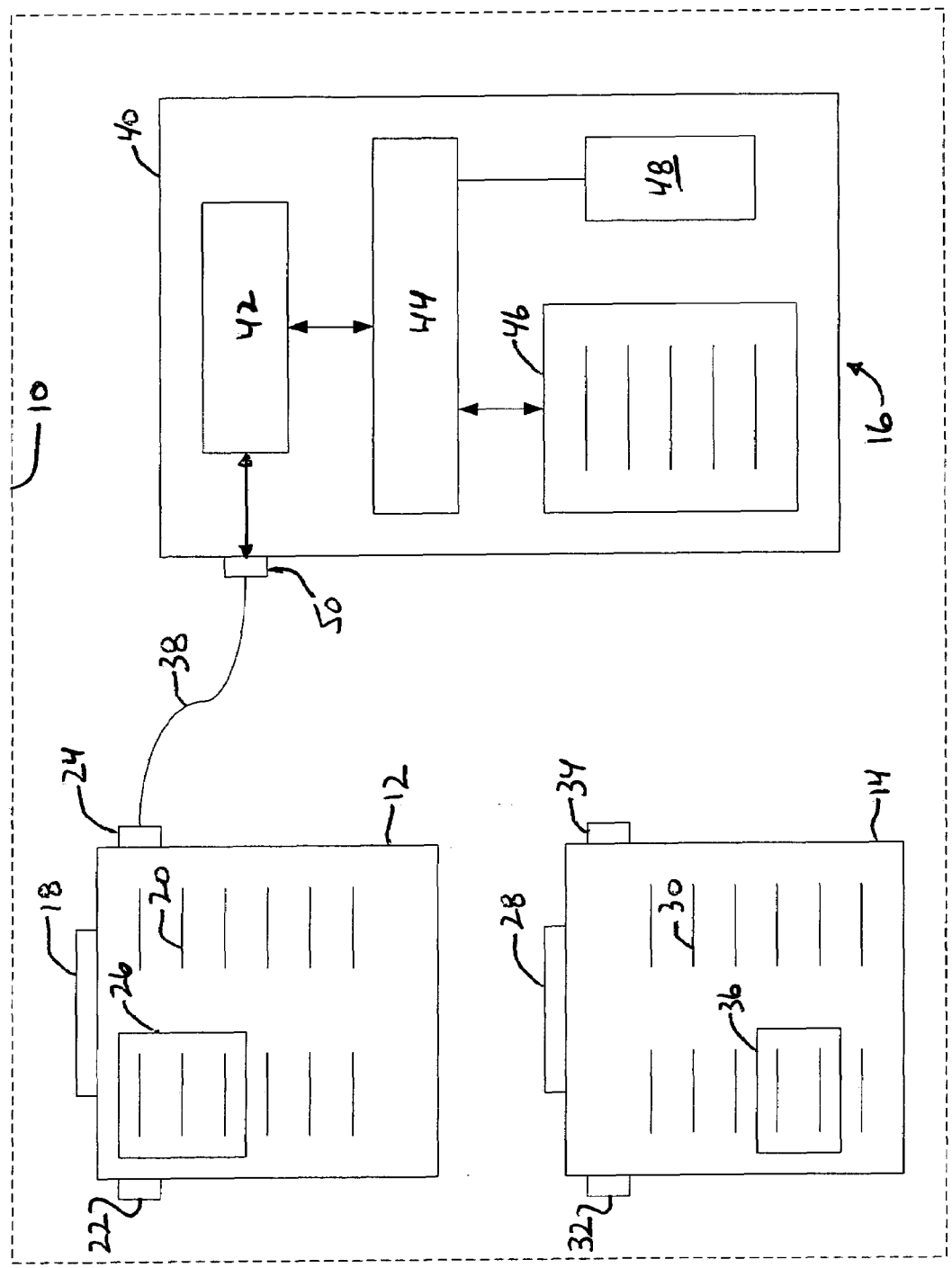
FIG. 1 illustrates various embodiments of a system for backing up information.

FIG. 1 illustrates various embodiments of a system 10 for backing up information. The system 10 includes a first frame 12, a second frame 14 and an apparatus 16. The first frame 12 includes a first controller 18, a first plurality of storage devices 20, a first network port 22, and a first communication port 24. The first plurality of storage devices 20 includes a first disk group 26 having a first disk configuration. The second frame 14 includes a second controller 28, a second plurality of storage devices 30, a second network port 32, and a second communication port 34. The second plurality of storage devices 30 includes a second disk group 36 having a second disk configuration.

According to various embodiments, the first disk group and the first disk configuration may be different than the second disk group and the second disk configuration. For example, the first disk group may be configured as a RAID 5 and may include three 300 gigabyte storage disks, whereas the second disk group may be configured as a RAID 1 and may include two 600 gigabyte storage disks. According to various embodiments, the first and second frames 12, 14 may adhere to different access protocols. For example, the first frame 12 may adhere to an ATA access protocol and the second frame 14 may adhere to a SCSI access protocol.

According to various embodiments, the first and second frames 12, 14 may comprise a portion of a storage area network (not shown), and may be connected to the storage area network via the first network port 22 and the second network port 32, respectively. According to various embodiments, the first frame 12 may be located close to or far away from the second frame 14.

The apparatus 16 is configured for communication with the first and second frames 12, 14. Thus, according to various embodiments, the apparatus 16 may be configured for communication with external devices (e.g., frames 12, 14) that adhere to different access protocols. Although the apparatus 16 is described as being configured for communication with the first and second frames 12, 14, it is understood by those skilled in the art that the system 10 may include a plurality of frames and/or other devices, and that the apparatus 16 is also configured for communication with the plurality of frames and/or other devices. As shown in FIG. 1, according to various embodiments, the apparatus 16 may be in communication with one of the first and second frames 12, 14 via a removable communication link 38. For example, one end of the communication link 38 may be coupled to the first frame 12 and the other end of the communication link 38 may be coupled to the apparatus 16.

The apparatus 16 includes a housing 40, a switch 42, a controller 44, a storage device 46, a battery 48 and a connector 50. The switch 42 is within the housing 40. According to various embodiments, the switch 42 is a network switch. According to other embodiments, the switch 42 is a network hub. The controller 44 is within the housing 40 and is in communication with the switch 42. According to various embodiments, the controller 44 is a RAID controller. According to various embodiments, the RAID controller is implemented as hardware RAID. According to other embodiments, the RAID controller is implemented as software RAID.

The storage device 46 is within the housing 40 and is in communication with the controller 44. According to various embodiments, the storage device 46 is one of a disk drive, a tape drive and a memory. The memory may be, for example, a semiconductor memory. According to various embodiments, the disk drive is one of a hard disk drive or an optical disk drive. The hard disk drive may differ from the first disk group 26 of the first frame 12 and the second disk group 36 of the second frame 14. For example, the hard disk drive may include, for example, five 120 gigabyte storage disks configured as just a bunch of disks (JBOD). Thus, it will be apparent to one skilled in the art that the apparatus 16 can back-up information from an external device (e.g., the first frame 12) having a different disk configuration than storage device 46 of the apparatus 16 does. Although the apparatus 16 is shown as having only one storage device 46, it is understood by those skilled in the art that the apparatus 16 may include a plurality of storage devices 46 that are in communication with the controller 44. The battery 48 is within the housing 40 and may, for example, be used to provide power to the storage device 46.

Figure 3:
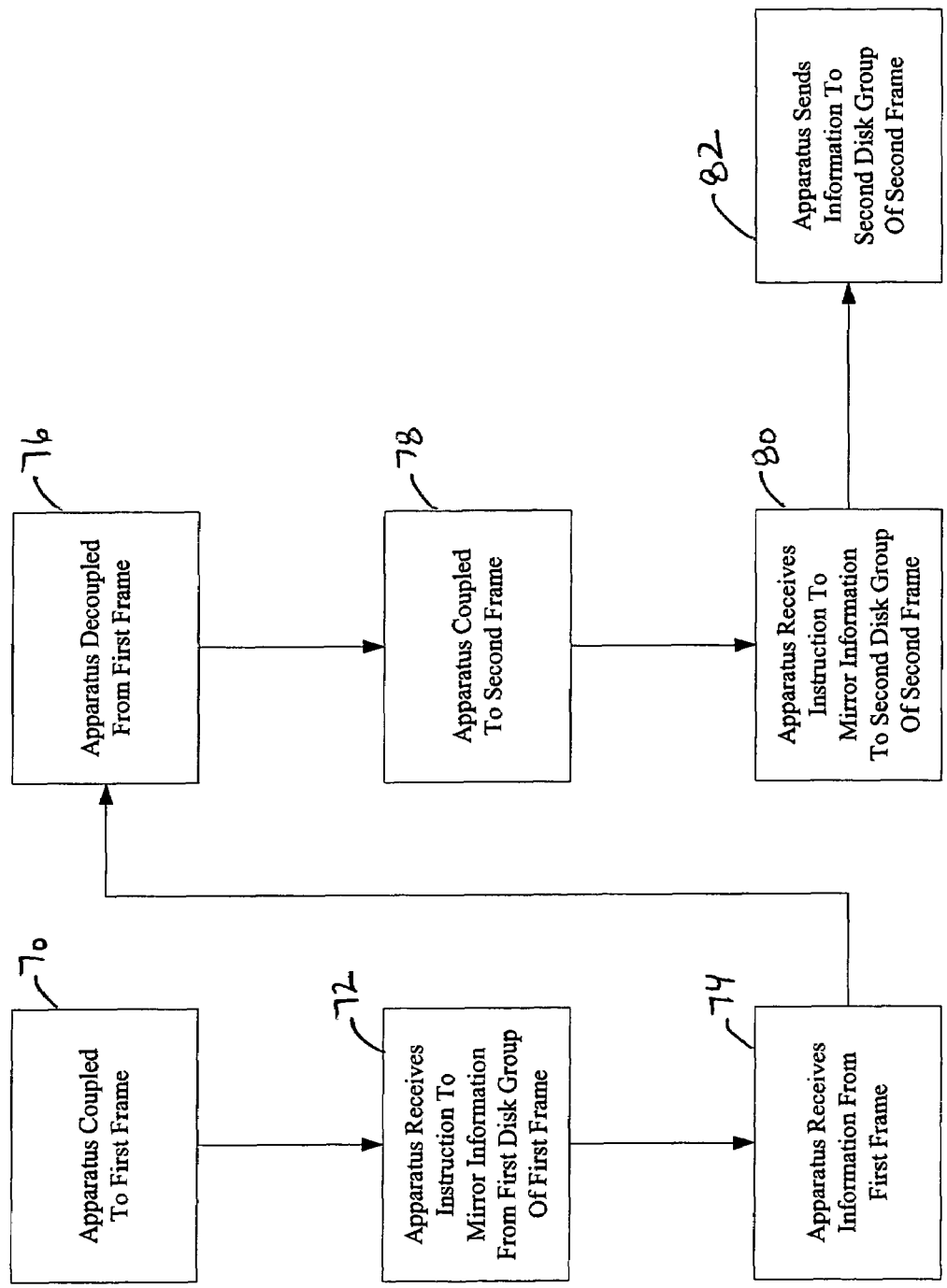
FIG. 3 illustrates various embodiments of methods for backing up information.

The connector 50 is in communication with the switch 42 and comprises, for example, a twisted pair connector and serves to couple the apparatus 16 to one end of the removable communication link 38. Although only one connector 50 is shown in FIG. 3, it is understood by those skilled in the art that the apparatus 16 may include a plurality of connectors 50. According to various embodiments, the connectors 50 may support, for example, category 5 or category 6 cable, power over Ethernet connections, and/or an iSCSI interface connection. According to various embodiments, the apparatus 16 is an externally powered apparatus. For example, the apparatus 16 may receive power from an uninterrupted power supply or from one of the first or second frames 12, 14.

Figure 2:
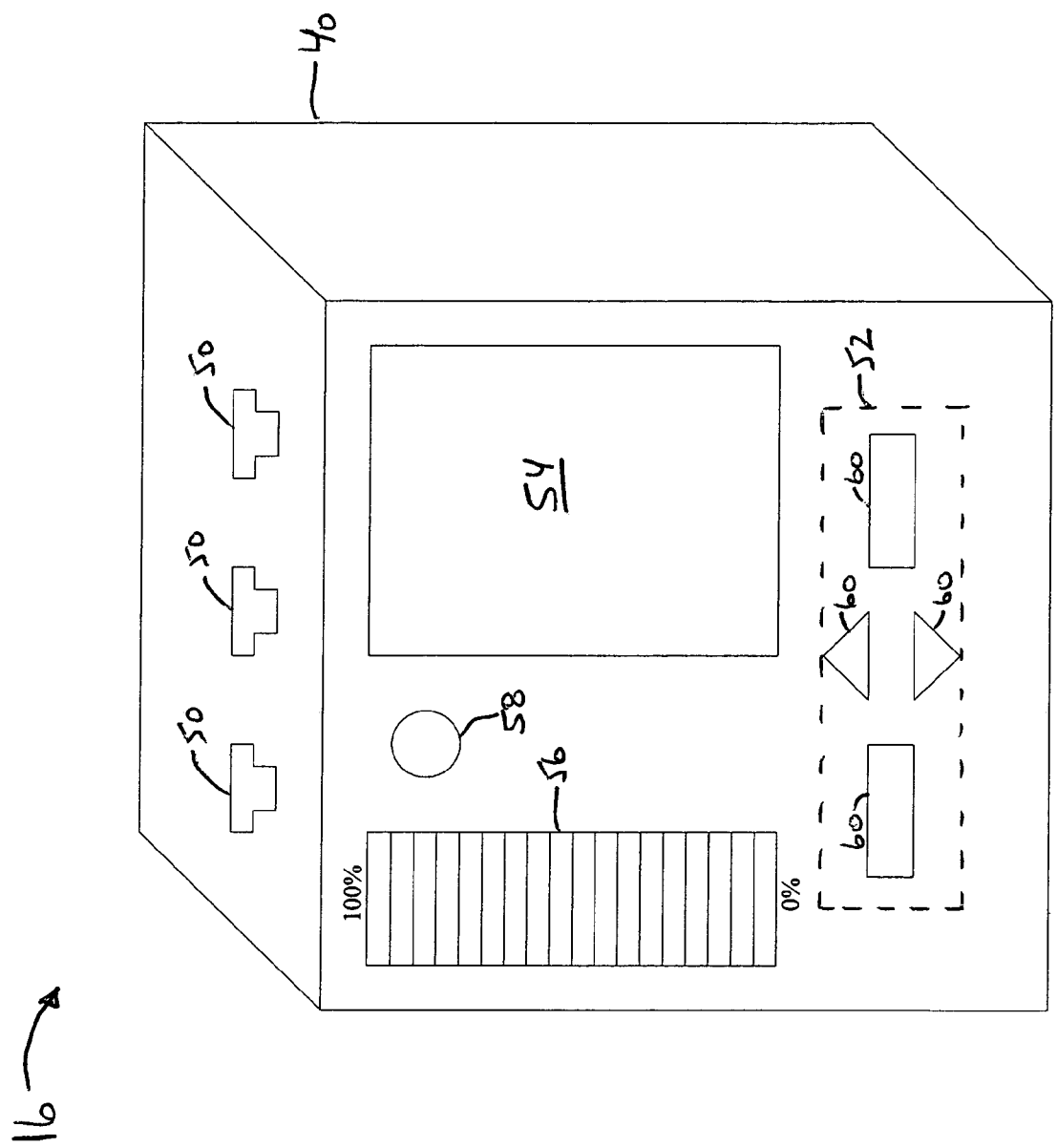
FIG. 2 illustrates various embodiments of an apparatus of the system of FIG. 1.

FIG. 2 illustrates various embodiments of the apparatus 16 of FIG. 1. The apparatus 16 may also include an input device 52, a display 54, a capacity gauge 56 and an activity light 58. The input device 52 is in communication with the controller 44, includes a plurality of press-buttons 60, and serves as a user interface to the apparatus 16. For example, when the apparatus 16 is used to back-up information from a particular disk group of the first frame 12, the input device 52 may be used to manually select the disk group and to start and stop the back-up operation. The display 54 is in communication with the controller 44, serves to show the status and/or progress of a back-up operation and, according to various embodiments, is implemented as a liquid crystal display. The capacity gauge 56 is in communication with the controller 44, and serves to provide a visual indication of the available storage capacity of the storage device 46 of the apparatus 16. The activity light 58 is in communication with the controller 44, serves to provide an indication that a back-up operation is being conducted and, according to various embodiments, is implemented as a light emitting diode.

FIG. 3 illustrates various embodiments of methods for backing-up information. The process begins at block 70, where the apparatus 16 is coupled to the first frame 12 via the removable communication link 38. One end of the communication link 38 is coupled to the connector 50 of the apparatus 16 and the other end of the communication link 38 is coupled to the first communication port 24 of the first frame 12.

From block 70, the process advances to block 72, where the controller 44 of the apparatus 16 receives an instruction to mirror information from the first disk group 26 of the first frame 12 to the storage device 46 of the apparatus 16. The instruction may be input to the apparatus 16 via the input device 52 of the apparatus 16. From block 72, the process advances to block 74, where the apparatus 16 receives the information to be backed-up from the first disk group 26 of the first frame 12 and stores the information at the storage device 46. According to various embodiments, the information is transferred from the first frame 12 to the apparatus 16 via the communication link 38 using the iSCSI protocol.

From block 74, the process advances to block 76, where the apparatus 16 is decoupled from the first frame 12. According to various embodiments, the apparatus 16 may be decoupled from the first frame 12 by detaching the communication link 38 from the first frame 12. According to various embodiments, any changes to the information stored at the first disk group are reflected at the storage device 46 of the apparatus 16 until the apparatus 16 is decoupled from the first frame 12.

From block 76, the process advances to block 78, where the apparatus 16 is coupled to the second frame 14 via the removable communication link 38. One end of the communication link 38 is coupled to the connector 50 of the apparatus 16 and the other end of the communication link 38 is coupled to the second communication port 34 of the second frame 14. As explained previously, the second frame 14 may be located far from the first frame 12. Thus, it will be apparent to those skilled in the art that the apparatus 16 may be a portable apparatus 16, capable of easily being moved any distance.

From block 78, the process advances to block 80, where the controller 44 of the apparatus 16 receives an instruction to mirror information from the storage device 46 of the apparatus 16 to the second disk group 36 of the second frame 14. The instruction may be input to the apparatus 16 via the input device 52 of the apparatus 16. From block 80, the process advances to block 82, where the apparatus 16 sends the information from the storage device 46 to the second disk group 36 of the second frame 14. According to various embodiments, the information is transferred from the storage device 46 of the apparatus 16 to the second disk group 36 of the second frame 14 via the communication link 38 using the iSCSI protocol.

As explained previously, the first frame 12 may adhere to an ATA access protocol, the first disk group 26 of the first frame 12 may be configured as a RAID 5 and may include three 300 gigabyte storage disks, the storage device 46 of the apparatus 16 may be configured as just a bunch of disks and may include five 120 gigabyte storage disks, and the second frame 14 may adhere to a SCSI access protocol, and the second disk group 36 of the second frame 14 may be configured as a RAID 1 and may include two 600 gigabyte storage disks. Thus, it is understood by those skilled in the art that the method described in blocks 70-82 may be employed to back-up information residing at a first device (e.g., the first frame 12) that adheres to a first access protocol to a second device (e.g., the second frame 14) that adheres to a second access protocol using asymmetric devices (e.g., the first frame 12, the apparatus 16 and the second frame 14).

In order to perform the above-described processes, the apparatus 16 may execute a series of instructions. The instructions may be software code to be executed by the controller 44 of the apparatus 16. The software code may be stored as a series of instructions or commands on a computer readable medium such as a random access memory (RAM) and/or a read only memory (ROM), a magnetic medium such as a hard-drive or a floppy disk, or an optical medium such as a CD-ROM. The software code may be written in any suitable programming language using any suitable programming technique. For example, the software code may be written in C using procedural programming techniques, or in Java or C++ using object-oriented programming techniques.

While several embodiments of the disclosed invention have been described, it should be apparent, however, that various modifications, alterations and adaptations to those embodiments may occur to persons skilled in the art with the attainment of some or all of the advantages of the disclosed invention. For example, according to various embodiments, the apparatus 16 may be coupled directly to a network as an iSCSI, NFS, SMB or other network-based storage option such that each device on the network can address the apparatus 16 directly based on their own particular access protocol. It is therefore intended to cover all such modifications, alterations and adaptations without departing from the scope and spirit of the disclosed invention as defined by the appended claims.

What is claimed is:

1. An apparatus contained within a housing, comprising:
   a controller;
   a connector mounted on the housing coupling the controller to a detachable communications link;
   an internal storage device in communication with the controller, wherein the controller is configured for communication with a plurality of external devices that employ different access protocols and different disk configurations via the detachable communications link;
   a network switch coupling the controller to the connector;
   a manual control panel mounted on the housing comprising:
      a visual storage device capacity gauge in communication with the controller;
      a backup progress visual display in communication with the controller;
      a backup activity light in communication with the controller; and
      a user input device in communication with the controller, whereby the user instructs the apparatus to request information from a first external device employing first protocol and store the information in a second external device employing a second protocol; and
   an internal power source coupled to the controller to provide power to the controller, the internal storage device and the control panel.

2. The apparatus of claim 1, wherein the controller is a RAID controller.

3. The apparatus of claim 2, wherein the RAID controller is a hardware controller.

4. The apparatus of claim 2, wherein the RAID controller is a software controller.

5. The apparatus of claim 1, wherein the storage device is one of a disk drive, a tape drive, and a memory.

6. The apparatus of claim 5, wherein the disk drive is a hard disk drive.

7. The apparatus of claim 5, wherein the disk drive is an optical disk drive.

8. The apparatus of claim 5, wherein the memory is a semiconductor memory.

9. The apparatus of claim 1, wherein the storage device includes a plurality of storage devices.

10. The apparatus of claim 1, wherein the apparatus is configured for communication with:
    a first external device that adheres to an ATA access protocol; and
    a second external device that adheres to a SCSI access protocol.

11. The apparatus of claim 1, wherein the apparatus is an externally powered apparatus.

12. The apparatus of claim 1, wherein the apparatus is a portable apparatus.

13. The apparatus of claim 1, wherein the connector supports one of a power over Ethernet and/or iSCSI connection.

14. The apparatus of claim 1, wherein the user input device allows a user to manually control the operation of the one of the plurality of external devices.

15. The apparatus of claim 9 wherein the internal storage device is a plurality of disks.

16. A system, comprising:
    a first frame that adheres to a first access protocol, wherein the first frame includes a first communication port;
    a second frame that adheres to a second access protocol, wherein the second frame includes a second communication port, and wherein the second access protocol is different than the first access protocol; and
    a portable apparatus contained within a housing and in communication with one of the first and second frames, wherein the portable apparatus includes:

a controller, wherein the controller manages data communication between the first frame and the second frame;

a connector mounted on the housing coupling the controller to a removable communications link;

an internal storage device in communication with the controller configured for communication with the first and second frames;

a network switch coupling the controller to the first frame and second frame;

a control panel integral to the housing comprising;
- a storage device capacity gauge in receiving capacity data from the controller;
- a backup progress display receiving progress data from the controller;
- a backup activity light receiving input from the controller;
- a user input device in communication with the controller permitting a user to direct the controller; and
- an internal power source coupled to the controller to provide power to the controller, the internal storage device and the control panel.

17. The system of claim 16, wherein the portable apparatus is in communication with one of:
- the first frame via the first communication port; and the second frame via the second communication port.

18. The system of claim 16, wherein:
- the first frame further includes a first disk group having a first disk configuration;
- the second frame further includes a second disk group having a second disk configuration; and
- the storage device includes a disk configuration different than the first and second disk configurations.

19. The system of claim 18, wherein the first disk configuration is different than the second disk configuration.

20. The system of claim 16, wherein:
- the first frame further includes a first network port; and
- the second frame further includes a second network port.

* * * * *